O. A. WALSTAD & S. O. PETERSON.
VOTING CHART.
APPLICATION FILED JAN. 12, 1914.
1,123,439.
Patented Jan. 5, 1915.
2 SHEETS—SHEET 1.
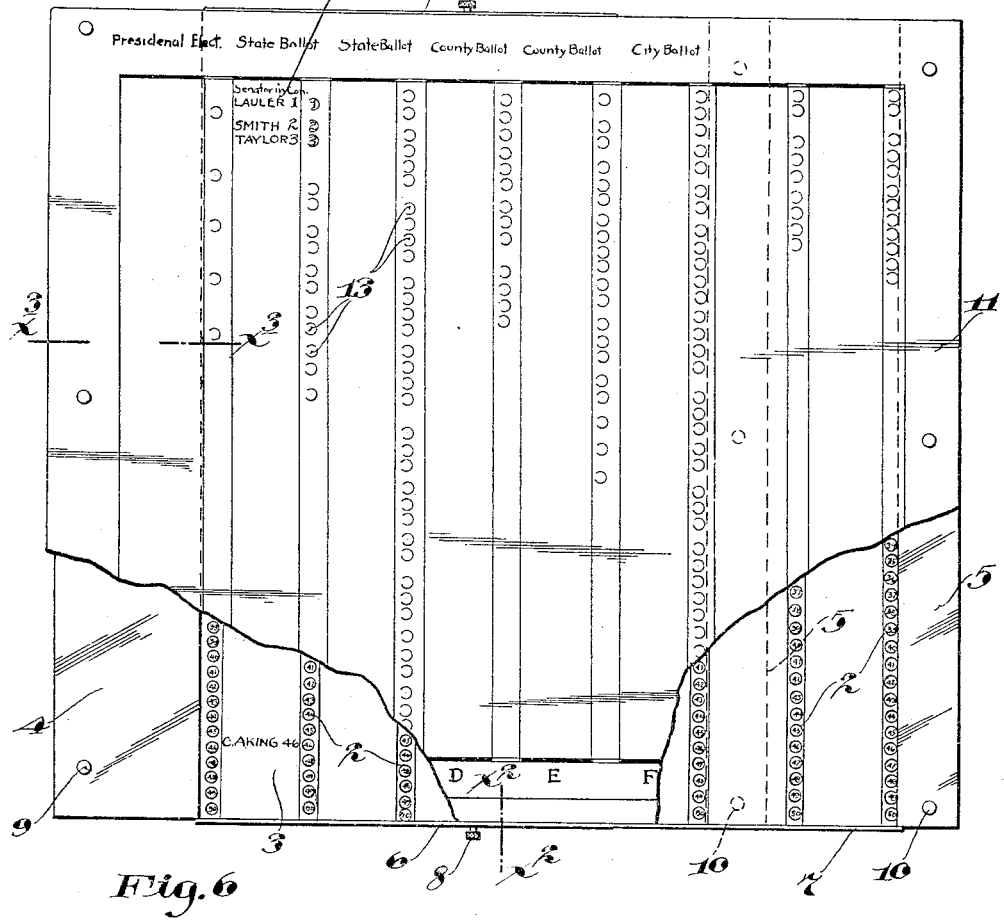
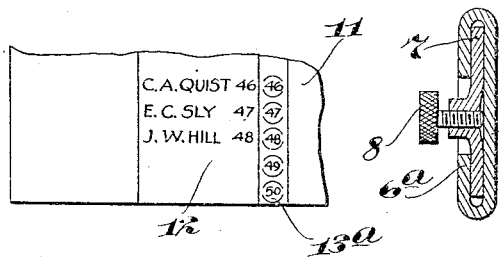
Witnesses
E. C. Skinkle
A. H. Opsahl
Inventors
Otto A. Walstad
Swan O. Peterson
By their Attorneys
Williamson Merchant O. A. WALSTAD & S. O. PETERSON.
VOTING CHART.
APPLICATION FILED JAN. 12, 1914.
1,123,439.
Patented Jan. 5, 1915.
2 SHEETS—SHEET 2.
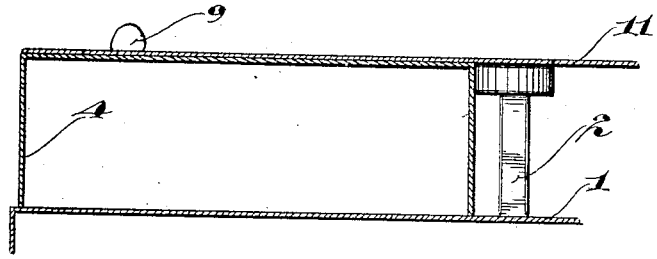
Fig. 3
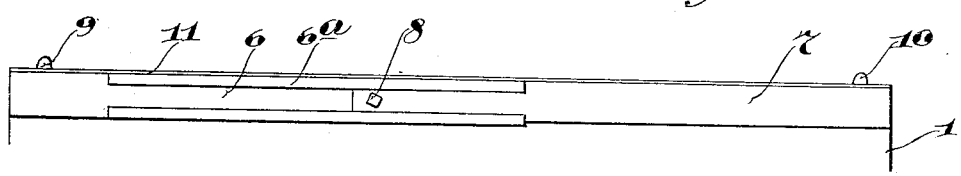
Fig. 4
Fig. 5
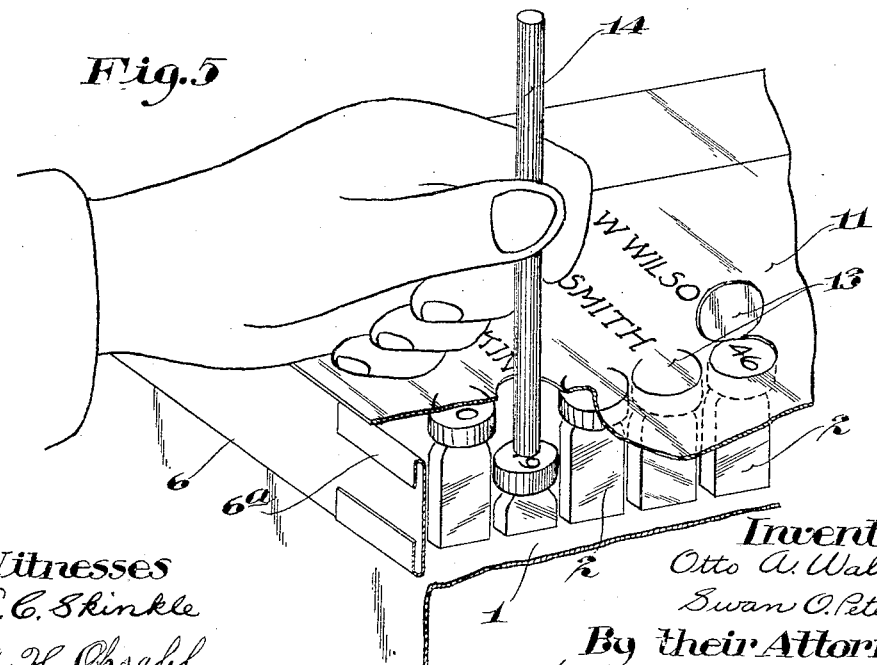
Witnesses
E. C. Skinkle
A. H. Opsahl.
Inventors
Otto A. Walstad
Swan O. Peterson
By their Attorneys
Williamson & Merchant

UNITED STATES PATENT OFFICE.

OTTO A. WALSTAD AND SWAN O. PETERSON, OF MINNEAPOLIS, MINNESOTA.

VOTING-CHART.

1,123,439. Specification of Letters Patent. Patented Jan. 5, 1915.

Application filed January 12, 1914. Serial No. 811,580.

*To all whom it may concern:*

Be it known that we, OTTO A. WALSTAD and SWAN O. PETERSON, citizens of the United States, residing at Minneapolis, in the county of Hennepin and State of Minnesota, have invented certain new and useful Improvements in Voting-Charts; and we do hereby declare the following to be a full, clear, and exact description of the invention, such as will enable others skilled in the art to which it appertains, to make and use the same.

Our invention has for its object to provide an extremely simple and highly efficient voting chart which is adapted to be prepared at leisure, to represent the votes desired to be cast at an election, and to be subsequently used in connection with a voting machine, to facilitate and simplify the manipulation of the keys of the voting machine in effecting the final casting of the votes.

The following facts are well known, to-wit, that voting machines are very expensive; and that one voting machine, as hitherto used, is not sufficient at the voting place of most precincts, to enable the casting of all of the votes of the voters of such precinct within the limits of time usually prescribed by law. The slowness or limitation of the speed of the voting machine is not inherent in the voting machine itself, but is occasioned by the slowness with which most voters are able, while at the machine, to select or pick out the keys representing candidates for whom they desire to vote.

Our invention, therefore, provides what, for lack of a better name, we have designated as a voting chart, and which chart, upon its face, is marked so that it corresponds to the keyboard and tickets on the voting machine in connection with which it is to be subsequently used. More definitely stated, this chart has the names of all the candidates in the same order and arrangement as will be found on the tickets of the voting machine, and in connection with each candidate or name, or other matter to be voted for or against, has partially formed perforations or other key locators adapted to be prearranged, to mark the places where keys of the machine are to be depressed, after the chart is applied to the machine, to properly register the votes which the particular voter has elected to cast when manipulating the keys of the machine. Preferably, this chart is made of heavy paper, and the key markers formed therein by cutting incomplete perforations, or nearly severed disks in the body thereof.

In connection with the voting chart, we preferably provide a frame which is adapted to be secured around the keyboard and which has on its face pins or other devices coöperating with perforations or other devices on the chart, to accurately locate the chart in respect to the keys of the voting machine.

In the accompanying drawings which illustrate the invention, like characters indicate like parts throughout the several views.

Referring to the drawings: Figure 1 is a plan view with some parts broken away, showing the voting chart and its holding frame applied to the keyboard of a voting machine, which keyboard is of the type having depressible keys such as the International voting machine; Fig. 2 is a detail in section on the line $x^2$ $x^2$ on Fig. 1; Fig. 3 is a section taken on the line $x^3$ $x^3$ on Fig. 1, some parts being broken away; Fig. 4 is a side or edge elevation showing the chart applied to its supporting frame; Fig. 5 is a sectional perspective showing portions of the keyboard, the chart and its supporting frame, and illustrating the manner of operating the keys when the chart is applied; and Fig. 6 is a fragmentary plan view illustrating a slightly modified arrangement of the key-locating perforations of the chart.

Of the parts of the voting machine, the numeral 1 indicates the keyboard face plate, the numeral 2 the keys, and the numeral 3 the ballots or tickets which are applied to the face plate of the voting machine in the usual way.

The chart supporting frame, as shown, is a rectangular thin sheet metal structure made up of two parallel laterally spaced channel-shaped bars 4 and 5, the ends of which are adjustably connected by thin metal tie straps 6 and 7 secured, respectively, thereto at their outer ends. As shown, the tie straps 6 are provided with overturned flanges 6ª that form a guide channel in which the ends of the straps 7 are adapted to slide, the latter being provided with set screws 8 by means of which the said bars may be secured in the proper adjustment to cause the ballot supporting frame to embrace the group of keys without freedom for much or any shifting movement. The bar 4 is provided with upwardly projecting dowel pins or studs 9, and the bar 5 is provided with similar upwardly projecting dowel pins or studs 10.

The voting chart 11 has perforations through which the dowel pins 9 and 10 are adapted to be passed when the said chart is properly located, and it is important to here note that there is a difference between the spacing of the pins 9 and the pins 10, so that it is impossible to apply the voting chart upside down, or in any other but the correct and accurate position. As already stated, this voting chart, on its face, is marked with ballots or tickets, which in Fig. 1, are indicated by the numeral 12, and which correspond exactly to the underlying ballots or tickets 3 applied to the key-board of the voting machine; and it is also formed with key-locators partially formed perforations, or in other words, by small disk-like portions that are nearly, but not quite, cut from the body of the chart, but which may be easily torn off to complete the perforation. The perforations, when completed, and when the chart is applied to the machine, will directly overlie the marked heads of the corresponding keys of the key-board and preferably, these partially severed disks 13 are marked with numerals corresponding to the numerals provided on the heads of the underlying keys.

By the use of this voting chart, the chart will be prepared before taking it to the machine, and this may be done in a booth away from the machine. The chart is prepared by removing the partially cut disks 13 so as to leave perforations in line with the names of candidates for whom it is desired to cast votes on the machine. Preferably, the perforations thus formed, are of slightly less diameter than the heads of the keys 2, so that the key heads will not project upward through the perforations, but will be visible therethrough, so that they may be easily released and depressed by the use of a small stick or pencil 14, for example, such as shown in Fig. 5. However, it will, of course, be understood, that this is only a preferred arrangement of the chart, as designed for use in connection with horizontal keyboards having corresponding depressible keys. By the proper and obvious modification, the chart may be designed for application to various other types of keyboard and keys of voting machines.

In the modification shown in Fig. 6, the perforation forming disks or portions 13ª are nearly cut from the chart by circumferentially spaced segmental slits, whereas, in the chart shown in Fig. 1, the said perforation forming disk is cut away except for a single connecting neck portion. In either instance, it is a very easy matter, by the use of a pencil or other pointed instrument, or by the use of fingers, to tear out the perforation forming disk wherever desired.

Obviously, when the voter with his prepared chart goes into the booth with the voting machine, and applies the chart to the keyboard of the voting machine, he can very quickly depress the keys underlying the perforations of the said prepared chart, and is thus enabled to very quickly register his vote on the voting machine. In fact, by the use of these pre-prepared voting charts, the vote registering capacity of the voting machine may be increased several times, and thus its capacity for registering votes is made such that one voting machine will do the work which would require several machines to do without this chart. Obviously, therefore, the use of this improved chart effects a very large saving in the investment required in voting machines. Another highly desirable result is this, that the voter is not hurried in preparing his vote and is given all the time desired for careful consideration and careful selection of the candidates for whom he desires to vote, whereas, in the ordinary use of a voting machine, he is hurried and frequently confused, so that he is often uncertain as to whether or not he has actually cast just the votes that he most desired to cast.

The voting chart, while preferably made of paper, may, nevertheless, if found desirable, be made of other material and is capable of various modification. If made of expensive material, the voting chart would have to be used over and over again, and hence, it is preferably made of paper which is of small cost, so that it can be used once and then thrown away.

It is of importance that the chart positioning frame be made adjustable, so that it may be adjusted to embrace either all or a part of the rows or groups of keys of the voting machine. As is well known, at some elections, less than all of the rows of the keys of the keyboard are required for use. In such a case, the chart would be cut a size to agree with the size of the ballot and thus prevent the use of a larger sheet than necessary.

It will, of course, be understood that the statement herein made that the "key locators are located over underlying keys," is used in a broad and liberal sense to indicate the relative alined arrangement of the corresponding keys and key locators.

What we claim is:

1. The combination with the key-board of a voting machine, of a pre-prepared chart having key locators corresponding to the keys of the said key-board and adapted to be manipulated to indicate the votes desired to be cast, and means for accurately locating the said prepared chart with its key locators over corresponding keys of said keyboard, the manipulated key-locators leaving the underlying keys free for manipulation.

2. The combination with the keyboard of a voting machine, of a pre-prepared chart having key locators corresponding to the keys of the said key-board and adapted to be manipulated to indicate the votes desired to be cast, and means for accurately locating the said prepared chart with its key locators over corresponding keys of said keyboard, the manipulated key-locators leaving the underlying keys free for manipulation, the said chart locating means comprising a frame that is adjustable to adapt itself to the key-board.

3. A voting chart in the form of a sheet of material having the names of candidates marked thereon and having associated with the said names partly formed key-locating perforations adapted to be torn away to complete said perforations and thereby indicate the position of keys that must be manipulated to cause the voting machine to register the votes represented on the said prepared chart, and the said perforations serving to expose the keys.

4. A voting chart in the form of a sheet of material having the names of candidates marked thereon and having associated with the said names partly formed key-locating perforations adapted to be torn away to complete said perforations and thereby indicate the position of keys that must be manipulated to cause the voting machine to register the votes represented on the said prepared chart, and the said perforations serving to expose the keys, in combination with means for accurately locating said prepared chart with its key locating perforations overlying corresponding keys of a keyboard to which it is applied.

In testimony whereof we affix our signatures in presence of two witnesses.

OTTO A. WALSTAD.
SWAN O. PETERSON.

Witnesses:
HARRY D. KILGORE,
F. D. MERCHANT.

Copies of this patent may be obtained for five cents each, by addressing the "Commissioner of Patents, Washington, D. C."